(12) United States Patent
Mortensen et al.

(10) Patent No.: US 11,546,266 B2
(45) Date of Patent: Jan. 3, 2023

(54) CORRELATING DISCARDED NETWORK TRAFFIC WITH NETWORK POLICY EVENTS THROUGH AUGMENTED FLOW

(71) Applicant: Arbor Networks, Burlington, MA (US)

(72) Inventors: Andrew D. Mortensen, Ann Arbor, MI (US); James E. Winquist, Ypsilanti, MI (US)

(73) Assignee: Arbor Networks, Inc., Westford, MA (US)

( * ) Notice: Subject to any disclaimer, the term of this patent is extended or adjusted under 35 U.S.C. 154(b) by 0 days.

(21) Appl. No.: 15/380,735

(22) Filed: Dec. 15, 2016

(65) Prior Publication Data
US 2018/0176139 A1      Jun. 21, 2018

(51) Int. Cl.
| | | |
|---|---|---|
| H04L 47/2441 | (2022.01) | |
| H04L 47/32 | (2022.01) | |
| H04L 9/40 | (2022.01) | |
| H04L 41/0631 | (2022.01) | |
| H04L 41/0893 | (2022.01) | |
| H04L 43/0829 | (2022.01) | |

(52) U.S. Cl.
CPC ........ *H04L 47/2441* (2013.01); *H04L 41/064* (2013.01); *H04L 41/0893* (2013.01); *H04L 43/0829* (2013.01); *H04L 47/32* (2013.01); *H04L 63/1416* (2013.01); *H04L 63/1458* (2013.01)

(58) Field of Classification Search
None
See application file for complete search history.

(56) References Cited

U.S. PATENT DOCUMENTS

| | | | | |
|---|---|---|---|---|
| 7,492,714 | B1 * | 2/2009 | Liao | H04L 12/4604 370/235 |
| 8,521,905 | B2 * | 8/2013 | Beliveau | H04L 67/327 370/224 |
| 8,606,746 | B2 * | 12/2013 | Yeap | G06F 21/6245 707/603 |
| 8,711,860 | B2 * | 4/2014 | Beliveau | H04L 67/327 370/392 |
| 8,718,064 | B2 * | 5/2014 | Beliveau | H04L 67/327 370/392 |
| 9,077,668 | B2 * | 7/2015 | Beliveau | H04L 67/327 |
| 9,172,651 | B2 * | 10/2015 | Zhang | H04L 63/1416 |
| 9,392,010 | B2 * | 7/2016 | Friedman | H04L 63/102 |
| 9,419,900 | B2 * | 8/2016 | Anghel | H04L 47/115 |
| 9,450,864 | B2 * | 9/2016 | Zhao | H04L 45/50 |
| 9,497,039 | B2 * | 11/2016 | Greenberg | H04L 12/4633 |

(Continued)

*Primary Examiner* — Gregory B Sefcheck
(74) *Attorney, Agent, or Firm* — Locke Lord LLP; Scott D. Wofsy; Christopher J. Capelli

(57) ABSTRACT

A method for correlating discarded network traffic with network policy events in a network includes receiving a flow record. The flow record includes initial network flow information in a standard flow record format. Discarded network traffic information associated with each network policy is received from a network policy enforcement device. Network traffic is discarded based on a network traffic policy. The received flow record is correlated with the received discarded network traffic information. The discarded network traffic information is encoded into the received flow record based on the correlation while maintaining the initial network flow information to yield an enhanced flow record.

18 Claims, 5 Drawing Sheets

(56) References Cited

U.S. PATENT DOCUMENTS

| | | | |
|---|---|---|---|
| 9,548,930 B1* | 1/2017 | Hardie | H04L 47/18 |
| 9,565,204 B2* | 2/2017 | Chesla | H04L 63/02 |
| 9,569,368 B2* | 2/2017 | Jackson | G06F 12/121 |
| 9,577,877 B2* | 2/2017 | Craine | H04L 41/0806 |
| 9,621,853 B1* | 4/2017 | Yang | H04L 65/403 |
| 9,641,436 B1* | 5/2017 | Stark | H04L 45/745 |
| 9,654,395 B2* | 5/2017 | Park | G06F 17/30345 |
| 9,680,870 B2* | 6/2017 | Parker | H04L 63/20 |
| 9,722,856 B2* | 8/2017 | Nagasubramaniam | H04L 41/0213 |
| 9,800,507 B2* | 10/2017 | Jiao | H04L 45/02 |
| 9,892,270 B2* | 2/2018 | Chesla | H04L 41/22 |
| 9,906,438 B2* | 2/2018 | Takajo | H04L 45/38 |
| 9,954,795 B2* | 4/2018 | Solis | H04L 45/54 |
| 9,967,279 B2* | 5/2018 | Chesla | H04L 63/02 |
| 9,985,872 B2* | 5/2018 | Jaffer | H04L 45/22 |
| 10,003,649 B2* | 6/2018 | Narayanan | H04L 67/1097 |
| 10,009,364 B2* | 6/2018 | Dasgupta | H04L 45/00 |
| 10,097,372 B2* | 10/2018 | Bhattacharya | H04L 45/745 |
| 10,298,517 B2* | 5/2019 | Iovanna | H04L 45/02 |
| 10,313,397 B2* | 6/2019 | Komu | H04L 63/0218 |
| 10,447,558 B2* | 10/2019 | Szilagyi | H04L 41/5067 |
| 10,547,639 B2* | 1/2020 | Hoffmann | H04L 47/12 |
| 2009/0073878 A1* | 3/2009 | Carlberg | H04L 47/6265 370/230 |
| 2015/0169451 A1* | 6/2015 | Jackson | G06F 12/0895 711/135 |
| 2015/0169457 A1* | 6/2015 | Jackson | G06F 12/121 711/135 |
| 2015/0304344 A1* | 10/2015 | Shin | H04L 63/20 726/1 |
| 2016/0080263 A1* | 3/2016 | Park | G06F 17/30345 370/392 |
| 2016/0234097 A1* | 8/2016 | Chang | H04L 12/6418 |
| 2016/0285737 A1* | 9/2016 | Higuchi | H04L 45/64 |
| 2016/0373364 A1* | 12/2016 | Yokota | H04L 12/6418 |
| 2017/0063927 A1* | 3/2017 | Schultz | H04L 63/20 |
| 2017/0171050 A1* | 6/2017 | Puzis | H04L 43/0876 |
| 2017/0195255 A1* | 7/2017 | Pham | H04L 49/25 |
| 2017/0353383 A1* | 12/2017 | Hughes | H04L 45/38 |
| 2018/0063018 A1* | 3/2018 | Bosch | H04L 47/822 |
| 2018/0176139 A1* | 6/2018 | Mortensen | H04L 47/20 |

* cited by examiner

| 0 | 1 | 2 | 3 |
|---|---|---|---|
| Netflow Version || Record Count ||
| System Uptime ||||
| Unix Seconds (timestamp) ||||
| Sequence Number ||||
| Source ID ||||

FIG. 4

| 0 | 1 | 2 | 3 |
|---|---|---|---|
| 220 (Template ID) ||||
| 1430 (total flowset length) ||||
| 192.168.1.27 (src IP) ||||
| 192.168.1.28 (dest IP) ||||
| 32156 (src port) ||||
| 80 (dest port) ||||
| 6 (protocol TCP) ||||
| 15588 (number of dropped bytes) ||||
| 10 (number of dropped packets) ||||
| 148573 (total number of bytes) ||||
| 953 (total number of packets) ||||
| 198.168.5.43 (src IP of flow record #2) ||||
| • ||||
| • ||||
| • ||||

FIG. 5

CORRELATING DISCARDED NETWORK TRAFFIC WITH NETWORK POLICY EVENTS THROUGH AUGMENTED FLOW

FIELD OF THE INVENTION

Embodiments of the present invention relate generally to the processing of network packets, and specifically to correlating discarded network traffic with network policy events through augmented flow.

BACKGROUND OF THE INVENTION

Various network management systems are used to monitor networks. These systems can exist as stand-alone, dedicated systems or be embedded in network communications devices such as routers and switches. Other tools include special-purpose systems, such as firewalls and other network security devices that are typically used to manage the communications at boundaries between the networks. One source of information for monitoring networks is flow information. A "flow" is defined as "a unidirectional sequence of packets with some common properties that pass through a network device." Internet Engineering Task Force, RFC 3954. More recently, another type of network metadata, referred to by various vendors as NetFlow, jFlow, sFlow, etc., has also been introduced as a part of standard network traffic (hereafter generally referred to as "flow records"). Flow records are often generated by the network devices. These are often digested information concerning individual network flows or groups of network flows sharing some common characteristic(s). The flow records often include, for example, internet protocol (IP) addresses, packet and byte counts, timestamps, Type of Service (ToS), application ports, input and output interfaces, to list a few examples. This information is available from Netflow technology, for example. Generally, computer network devices that generate flow records include, for example, routers, switches, firewalls, and hubs. In other examples, packet scanners/analyzers (e.g., Arbor Networks PEAKFLOW® threat management system (TMS)) are used. Flows may be collected and exported for analysis. Flow analysis is a central component of large-scale network management and service systems.

Additionally, the expansion of the Internet has led to improvements in packet traffic management. One such advancement is the use of policy rules for determining how packet traffic may be managed, such as limiting or blocking traffic matching certain patterns from entering a protected network. However, as the packet traffic and network applications have increased in volume and complexity, effective policy rules have also become more difficult to define and manage. Furthermore, the impact of modifications made to such policies is often visible to network operators only in a general sense.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for correlating discarded network traffic with network policy events in a network is provided. The method includes receiving a flow record. The flow record includes initial network flow information in a standard flow record format. Discarded network traffic information associated with each network policy is received from a network policy enforcement device. Network traffic is discarded based on a network traffic policy. The received flow record is correlated with the received discarded network traffic information. The discarded network traffic information is encoded into the received flow record based on the correlation while maintaining the initial network flow information to yield an enhanced flow record. In another aspect, a monitoring system includes a monitored network consisting of a plurality of devices. The monitoring system further includes one or more physical network elements and a network policy enforcement device communicatively coupled to the monitored network by the one or more physical network elements. The monitoring system also includes a flow record repository for storing flow record information and one or more network monitoring devices communicatively coupled to the monitored network by the one or more physical network elements and communicatively coupled to the flow record repository. The monitoring device(s) are configured and operable to receive a flow record including initial network flow information from the one or more physical network elements in a flow record format. Discarded network information associated with each network policy is retrieved from the network policy enforcement device by the monitoring device(s). Certain network traffic is discarded based on a network traffic policy. The received flow record is correlated with the received discarded network traffic information. The discarded network traffic information is encoded, by the monitoring device(s), with the received flow record based on the correlation while maintaining the initial network flow information to yield an enhanced flow record.

BRIEF DESCRIPTION OF THE DRAWINGS

The accompanying appendices and/or drawings illustrate various, non-limiting, examples, inventive aspects in accordance with the present disclosure:

FIG. 4 is a schematic diagram illustrating a packet for transporting flow information according to an embodiment of the present invention; and FIG. 5 is a schematic diagram illustrating enhanced flow record information, according to an embodiment of the present invention.

DETAILED DESCRIPTION OF CERTAIN EMBODIMENTS

Figure 1A:
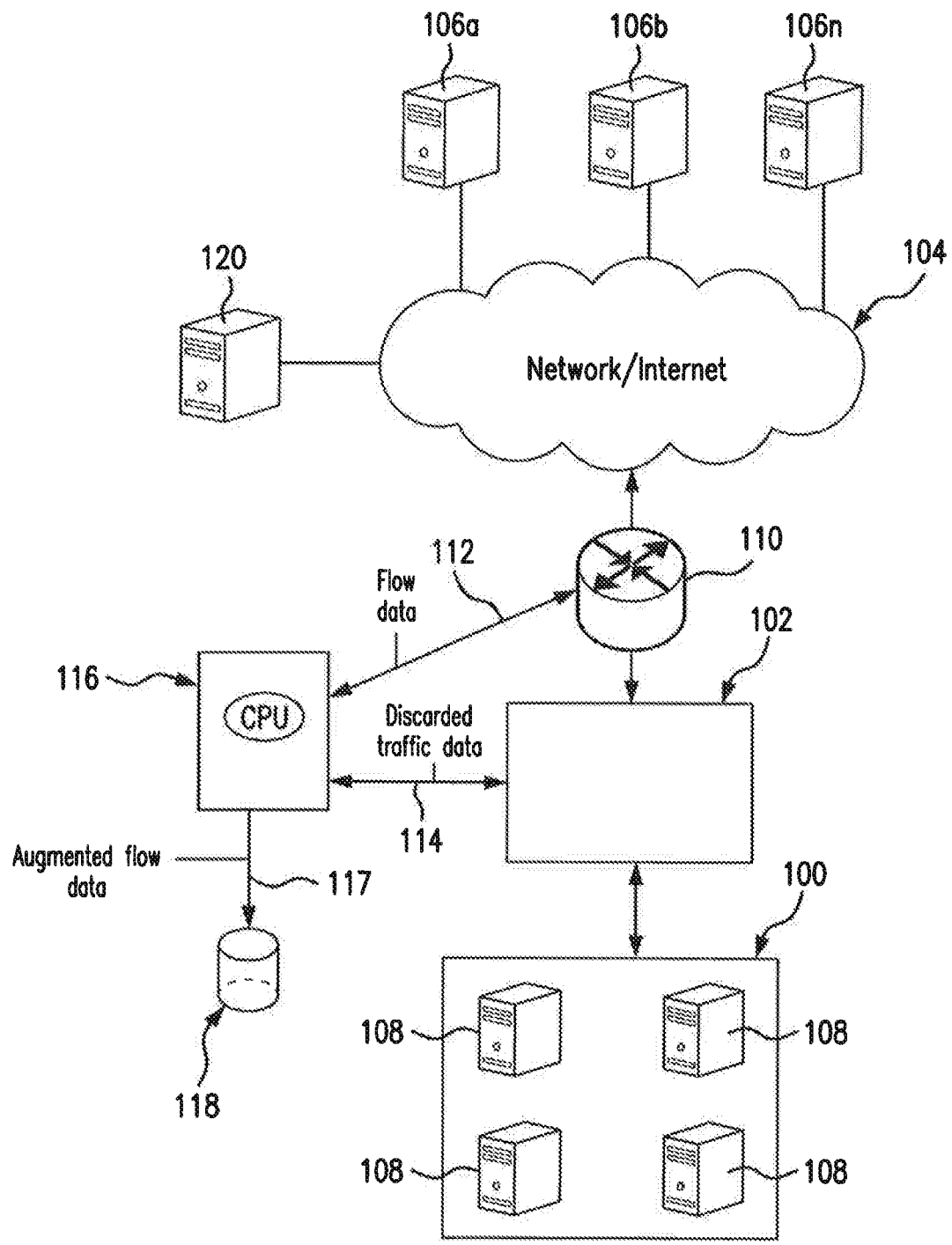
FIG. 1A is a block diagram of the inventive flow augmentation system deployed within a traditional network.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

For many computer networks, the standard flow information that is typically transmitted from network devices is somewhat limited. It is desirable in computer networks to add intelligence to standard network flow monitoring to implement new types of detection and analysis based on flow data.

Various embodiments of the present invention can be used to facilitate the creation of scalable flow monitoring solutions. The embodiments of the invention also demonstrate that there can be a reasonably low overhead for this lightweight approach.

It will be appreciated that network traffic policies can be introduced by various embodiments for the purpose of enforcing best common networking practices, optimizing network traffic paths, protecting or enhancing services, detecting important or unusual network events that might be indicative of security attacks, reporting traffic spikes on the network, detecting attacks on the network, and/or fostering better usage of network resources. Policies can be general purpose or time-based, and can be applied to a specific class or a subset of the network traffic flowing to destinations within or beyond a protected network. An embodiment of the invention contemplates the provision of multiple policy modules to restrict/discard some portion of received network traffic.

Primarily, Deep Packet Inspection (DPI) is deployed to allow policies to be aware of (i.e. take account of) layer 7 (the application layer) of the OSI network stack. However, other equipment can be used to apply policies at lower layers (e.g. layer 4, the transport layer). For example, an IP router is able to apply policies to restrict or block traffic matching certain patterns (e.g., certain blocks of IP addresses) from entering the network. IP routers are also able to account for the volume of traffic to/from different IP addresses.

As noted above, regardless of the reasons or mechanisms driving the discard policy, the impact of modifications made to such policies is often visible to network operators only in a general sense. For example, this association of a traffic control policy set with a network service usage activity currently can be achieved by operators adjusting the policy and monitoring overall traffic rates.

An embodiment of the present invention takes in standard flow records exported from network devices such as routers, switches, firewalls, hubs, etc., and annotates the flow with discarded traffic information. This information is derived from a number of sources, including, for example, attack mitigation devices as well as other network policy enforcement devices. These annotations add discarded traffic information to the flow data, and can be used to perform further data flow analysis that is not available without such information. The annotated flow is then resent to a configurable set of destinations using standard flow formatting or another common data serialization format. For example, Netflow v9 format with user defined fields or IPFIX format with enterprise specific information elements may be used in some implementations. The Internet Engineering Task Force (IETF) request for comment (RFC) 7011, entitled Specification of the IP Flow Information Export (IPFIX) Protocol for the Exchange of Flow Information describes a flow as traffic carried on a data network as packets. This embodiment allows the enhanced flow record to be processed and the enhanced data flow information to be used by other flow analysis tools and existing flow analysis infrastructure.

Various data sources may be used to annotate the flow. A "data source," as used herein, may include any entity initiating or providing data through a data flow. In some embodiments, a single data flow may have multiple collaborating data sources.

Advantages over existing systems include real-time data gathering on the state of existing network traffic flows and real-time mapping of discarded traffic directly at the flow level. Furthermore, network operators can use this augmented flow information as a historical reference when performing root cause analysis to pinpoint which policy changes led to discarded traffic and/or to take active countermeasures against detected malicious activity. Of note, while the impact of modifications to various policies as a whole may become apparent, performing mapping of discarded traffic at the flow level affords an opportunity to correlate policy changes with discarded traffic in a comprehensive manner for a plurality of individual flows in the network.

In general, according to one aspect, embodiments of the present invention feature a method of processing network flow information. The method comprises receiving a flow record exported from a network device element and augmenting the flow record with discarded network traffic information.

In a common implementation, the network device element is any of: a server, a router, a switch, a hub, a firewall, a packet scanner/analyzer, or any other computing device. In addition, the method includes sending the enhanced flow record to a configurable set of destinations using customized flow formatting.

In general, according to another aspect, the embodiments of the invention feature a flow augmentation module. This flow augmentation module comprises a flow analysis engine which receives flow record from a network device and which selects discarded traffic information received from at least one source to be added to the flow record. A flow encoding and distribution engine is provided that augments the flow record with the selected discarded traffic information to create an enhanced flow record, and that transmits the enhanced flow record to a configurable set of destinations comprising at least one of an additional flow augmentation module, a flow data repository and a flow consumer. An enhanced flow reporting engine is configured to provide the enhanced flow information responsive to users' requests.

Turning now descriptively to the drawings, in which similar reference characters denote similar elements throughout the several views, FIG. 1A illustrates a block diagram of a flow augmentation system deployed within a traditional network, according to the principles of the present invention. More specifically, FIG. 1A illustrates the relationship between the protected network 100, attack mitigation device 102, Internet 104, external host devices 106a, 106b . . . 106n and the network monitor 116.

In a typical implementation, the external host devices 106a, 106b . . . 106n (also referred to as external devices or host devices) attempt to connect to protected devices 108 within the protected network 100 typically via a private network or a public computer network such as the Internet 104. Examples of external host devices include servers, laptops, desktop computers, tablet devices, mobile phones, mobile computing devices, video games systems, televisions and other similar devices and systems having Internet connectivity.

In a preferred embodiment, the protected network 100 is protected by the attack mitigation device 102 preferably located between the Internet 104 and the protected network 100. In FIG. 1A, the attack mitigation device 102 is able to connect to devices within different networks (i.e., Internet) through communication devices 110 such as hubs, switches, and routers. Usually, the protected network 100 is an enterprise network, such as a school network, business network, and government network, to list a few examples. In other embodiments, the attack mitigation device 102 is located within the Internet, service provider network or enterprise network rather than as a network edge as illustrated. It is to be appreciated that when deployed within the protected network, traffic is diverted to the mitigation device 102.

The mitigation device 102 preferably includes a packet processing system preferably having an external high-speed network interface and a protected high-speed network interface (not shown in FIG. 1A). Under current technology, these interfaces are capable of handling 1.5-40 Gbps, for example. In a typical implementation, the mitigation device 102 authenticates all external host devices 106a, 106b . . . 16n before allowing the external devices to access the protected devices 108 within the protected network 100.

To protect against network attacks, the mitigation device 102 distinguishes between requests from legitimate hosts 106a-106n and attack traffic from attacking host 120. Typically, the mitigation device 102 may employ a plurality of different host validation (authentication) procedures/algorithms. The mitigation device 102 inspects and authorizes traffic from each host device trying to access the protected network 100 with a host table. The host table is a data structure that stores IP addresses of external devices attempting to connect to the protected network 100.

According to exemplary configuration illustrated in FIG. 1A, the attack mitigation device 102 may comprise a Client Edge (CE) device. The CE device can provide entry points into the protected network 100. In alternative configuration, the attack mitigation device 102 may comprise a virtual device. In other words, at least some of the embodiments do not require the attack mitigation device 102 to be a physical hardware device or to be located in a particular part of the network infrastructure, as long as the attack mitigation device 102 can be in the path of the incoming traffic to the protected network 100.

Furthermore, network communication devices such as routers and/or switches 110 collect flow information from the packet information that is transmitted between the protected network 100 and other networks 104. Flow information may also be collected, in some examples from packet monitors or taps (not shown in FIG. 1A) that are installed usually solely to monitor packet traffic. A non-limiting example here is the Netflow Analyzer offered by Cisco Systems, Inc. monitor for malicious code/packets.

The flow information 112 from these flow sources is forwarded to one or more network monitors 116. In the illustrated example, a single network monitor 116 is deployed. In other examples, a plurality of network monitors may function in a peer-to-peer relationship.

Primarily, the network monitor 116 is used to monitor network activity based on the received flow information 112. In a general sense, the network monitors 116 collect and analyze the flow to determine whether the network activity is in compliance with traffic policies for the protected network 100. As noted above, such policies include network management policies related to traffic levels, for example, and network security policies related to maintaining the security of the protected network 100 and protecting it against attacks, such as denial of service attacks, viruses, or worms.

In addition, the network monitor 116 may be configured and operable to obtain discarded traffic information 114 from the network policy enforcement device, such as the attack mitigation device 102. In various embodiments, such information may include any relevant information about new incoming traffic being dropped or discarded by the attack mitigation device 102. Thus, according to embodiments of the invention, the network monitor 116 augments the flow information with discarded traffic information received from the network policy enforcement device. It should be noted that the policy discarding traffic may not have a source and destination address. For example, a router or mitigation device may have a policy in place to drop all traffic to or from a particular port number. In that case, the policy—e.g. drop traffic to port 23—is applied to all flows originating from the port. Furthermore, in that case the dropped byte and packet counters in the augmented flow are the same as the number of bytes and packets sent in the flow. As shown in FIG. 1A, the network monitor 116 sends the enhanced flow information 117 to a flow record repository 118 for storage. In the embodiment implementing more than one network monitors, the network monitor 116 which augments the flow information may send the enhanced flow information 117 to other network monitors for further flow analysis, for example. While the embodiment of the present invention illustrated in FIG. 1A is described with respect to an attack mitigation device and a protected network, it should be noted that various embodiments of the present invention contemplate any conventional network policy enforcement device integrated into any suitable network.

Figure 1B:
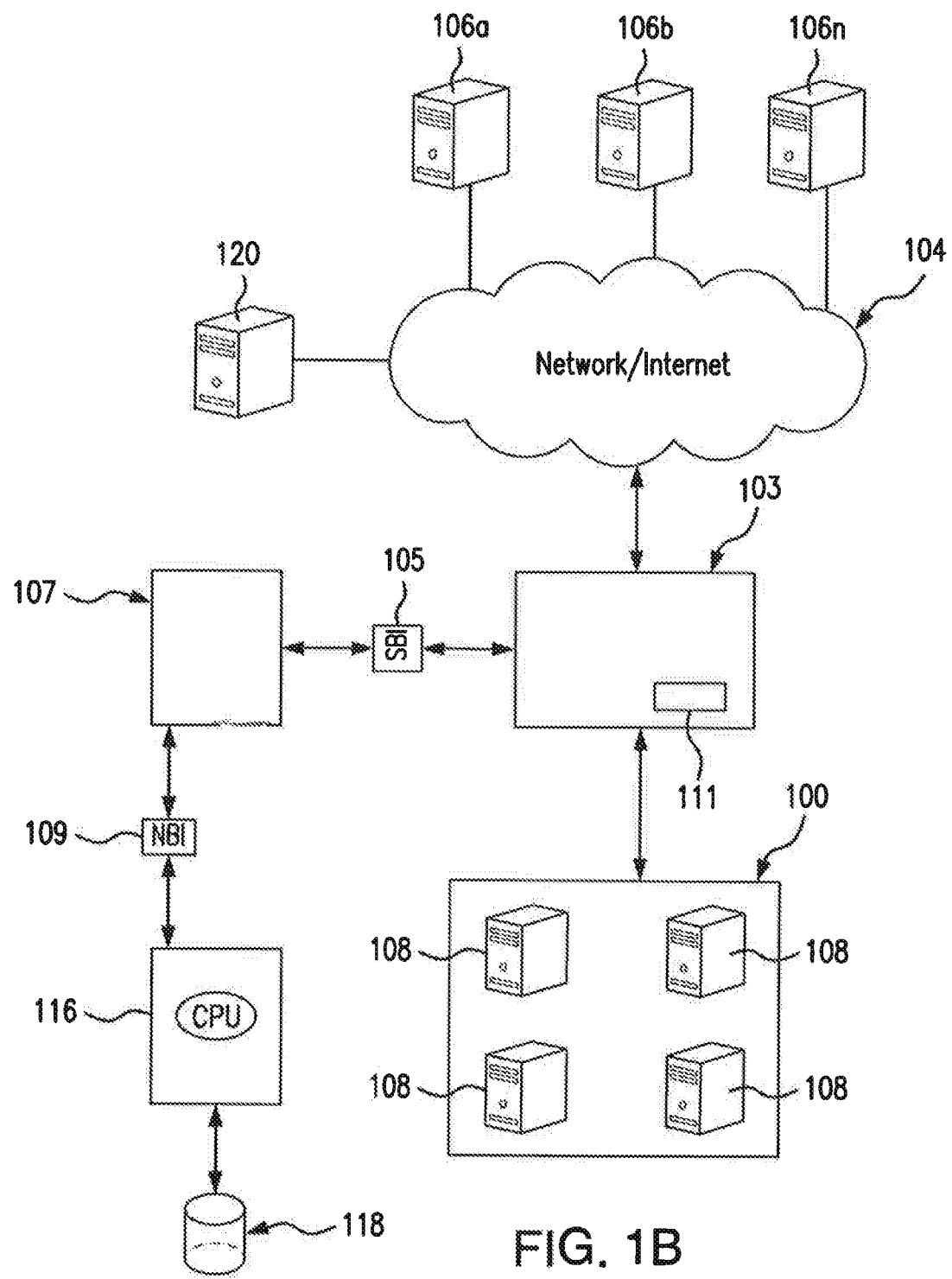
FIG. 1B is a block diagram of the inventive flow augmentation system deployed within a Software Defined Networking (SDN) environment.

FIG. 1B is a block diagram of the inventive flow augmentation system deployed within a SDN environment. In other words, this exemplary embodiment is carried out in the SDN-based system. In SDN architecture, the control plane conventionally used for communication networks is decoupled from the data plane, thus allowing services to be managed abstractly and in a centralized manner. Network intelligence and state can be logically centralized, and the underlying network infrastructure can be abstracted from the executing applications. As a result, communication network carriers can gain enhanced programmability, automation, and network control, enabling them to build highly scalable, flexible networks that readily adapt to changing needs. Typically, a SDN includes a software layer consisting of an application and a hardware layer consisting of a hardware abstraction layer and hardware.

OpenFlow is an example of a SDN protocol. OpenFlow protocol provides a common communication protocol between SDN controllers and other network devices. The OpenFlow protocol describes message exchanges that take place between an OpenFlow controller and one or more OpenFlow switches. Commands or messages used by the OpenFlow protocol may be extended to include new commands or messages that are compatible with the protocol.

In FIG. 1B, the protected network 100 is interconnected with other networks 104 by means of a SDN-enabled switch 103 and a SDN-enabled controller 107 for controlling it. The SDN-enabled controller 107 (referred to hereinafter as OpenFlow controller) provides flow control information (an output port, QoS, etc.) for handling received packets. The SDN-enabled switch 103 (referred to hereinafter as OpenFlow switch) handles packets based on the flow control information provided from the OpenFlow controller 107.

Typically, an OpenFlow switch has an OpenFlow table 111 for storing the flow control information. Upon receiving a packet corresponding to a flow stored in the OpenFlow table 111, the switch 103 handles the packet according to the flow control information.

The controller 107 in the SDN environment implements control and management using software modules such as software logic, a North Bound Interface (NBI) 109, through which an application can install and manage rules for controlling traffic flows, and a South Bound Interface (SBI) 105. As shown in FIG. 1B, the network monitor 116 interacts with the OpenFlow controller 107. In one embodiment, the network monitor 116 receives both flow information and discarded traffic information. In this case, the flow information may still be coming from a network traffic forwarding element. Furthermore, the OpenFlow controller 107 controls the OpenFlow switch 103 through the SBI 105, thereby implementing functions, such as data forwarding, required by the control logic. For the sake of brevity, the elements and features of FIG. 1B that are similar to those previously shown and described with reference to FIG. 1A will not be described.

Figure 2:
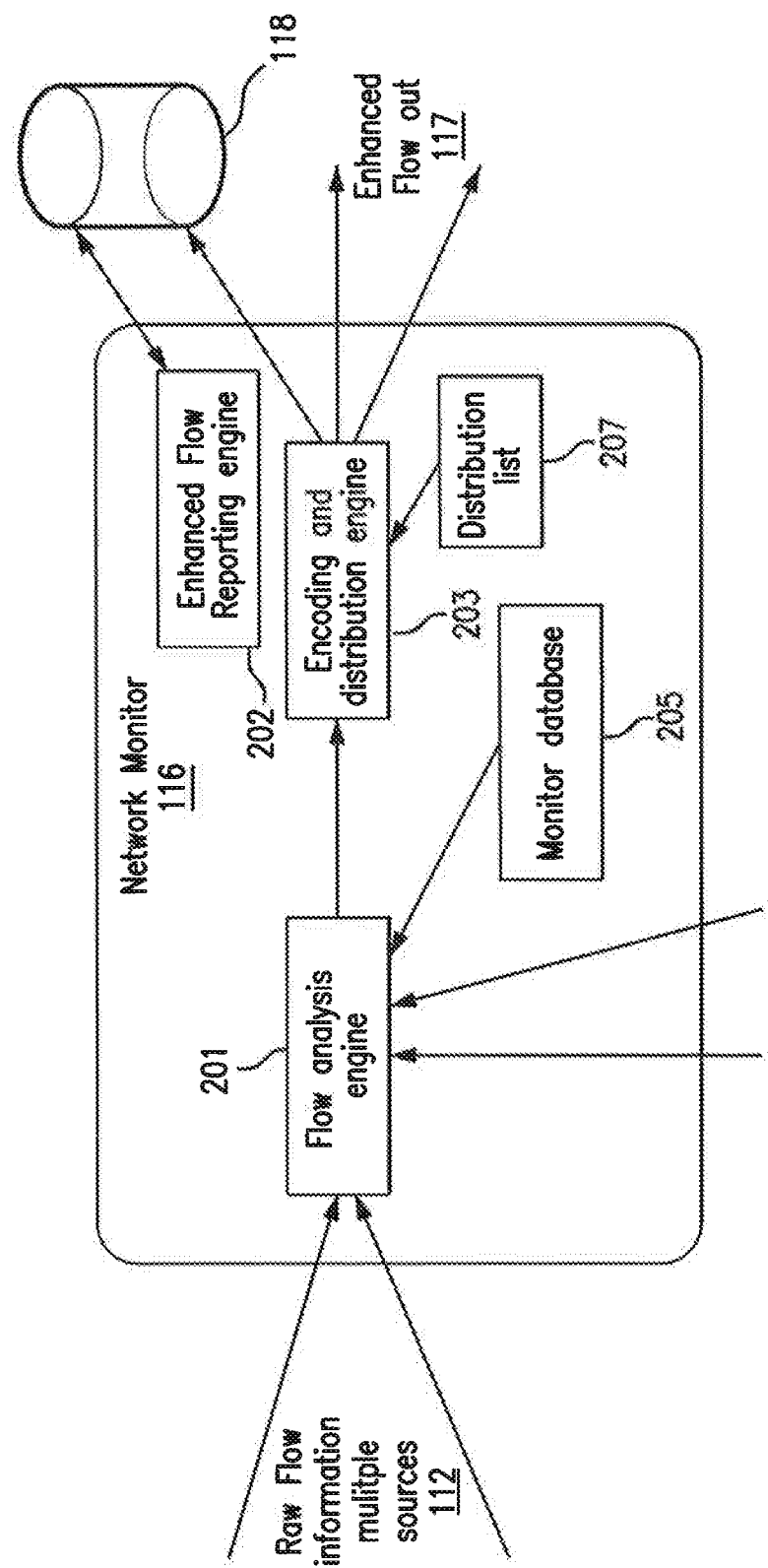
FIG. 2 is a schematic diagram of the network monitor of FIGS. 1A and 1B, according to an embodiment of the present invention.

FIG. 2 is a schematic diagram of the flow augmenting network monitors 116 of FIGS. 1A and 1B. Here the monitor 116 is logically broken down into three functions: a flow analysis engine 201, a flow encoding and distribution engine 203 and an enhanced flow reporting engine 202. Although shown separately, these three functions are often combined into a single operating module, implemented in hardware, software, or a combination thereof.

When the flow data 112 are received from the network devices 103, 110, the network monitor 116 applies available policies to the flow and correlates the flow information with the discarded traffic information to augment the received flow records.

The enhanced flow is then encoded and distributed by the distribution engine 203 to various consumers of the flow information. A distribution list 207 identifies the entities that will receive the enhanced flow information 117. At least in some embodiments, the distributed enhanced flow information 117 may be stored in the flow repository 118.

According to an embodiment of the present invention, the enhanced flow reporting engine 202 may be configured to provide reporting functionally related to the enhanced flow information responsive to users' requests. For example, the enhanced flow reporting engine 202 may provide augmented network flow information of interest (i.e., counts for dropped bytes/packets) broken down by specific flows. Additional information about the enhanced flow reporting engine 202 is provided below.

Figure 3:
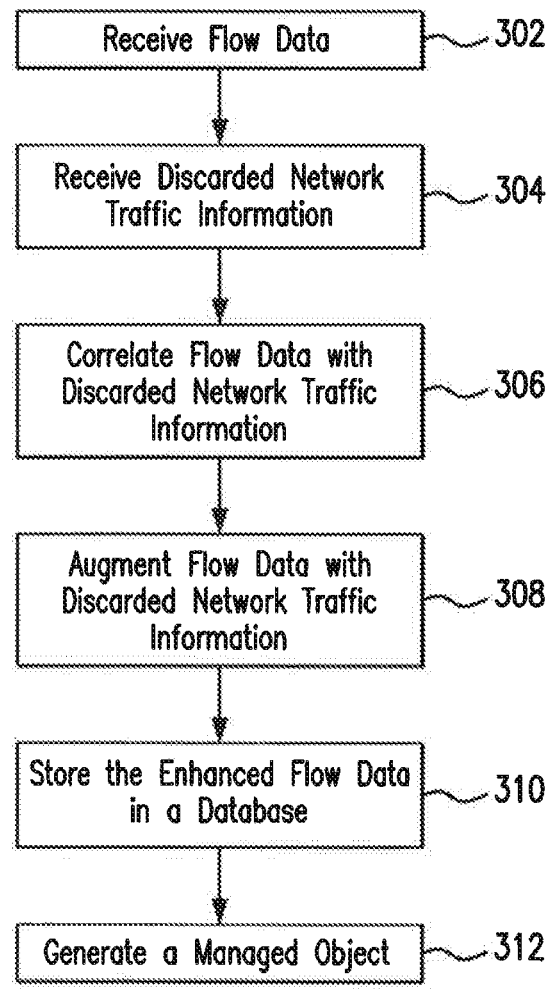
FIG. 3 is a flowchart showing the operation of the flow analysis engine and the encoding and distribution engine of the network monitor, according to an embodiment of the present invention.

FIG. 3 is a flowchart showing the operation of the flow analysis engine 201 and the encoding and distribution engine 203 of the network monitor 112, according to an embodiment of the present invention. Before turning to description of FIG. 3, it is noted that the flow diagram in FIG. 3 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

Starting with FIG. 3, in step 302, flow data are received by the flow analysis engine 201. This received data comprises, in examples, standard flow records, for example from network communication devices such as routers 110, a SDN-enabled switch 103 or other network devices.

In step 304, the flow analysis engine 201 obtains discarded network traffic information from various network policy enforcement devices, such as, but not limited to, attack mitigation device 102 and a SDN-enabled switch 103. In one embodiment, the discarded network traffic information includes dropped packet/byte counts indicating the number of packets and bytes dropped/discarded by a corresponding network communications device based on a particular policy, for example. In one embodiment, the flow analysis engine 201 supports different policies, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link allows, thereby reducing queuing in router buffers and improving overall efficiency. A rate policy can be configured to establish a minimum rate for each flow, allow for prioritized access to excess available bandwidth, and/or set limits on total bandwidth that the flow can consume. A discard policy typically causes a network policy enforcement device, such as the attack mitigation device 102, to discard or drop data packets or flows associated with a particular traffic class. In various embodiments, the flow analysis engine 201 may receive policy information from the routers HO, a SDN-enabled switch 103 or other network devices.

In one embodiment, the discarded network traffic information may be represented in the form of an access control list (ACL) specifying actions to be performed by a network device when the predefined conditions are met. The ACL compares a portion of network traffic e.g., a frame header to one or e of the conditions. If a condition is satisfied, ACL instructs the network device to perform a corresponding action (i.e., drop the packet).

In another embodiment, the discarded network traffic information may be represented in the form of a flow specification object, which may include various flow related attributes. In yet another alternative embodiment, the discarded network traffic information may be associated with a "black hole route." Routers such as router 110 may have associated IP addresses. In a black hole route scenario, a router such as router 110 may be informed that all packets to a particular IP address should be dropped.

In step 306, the flow analysis engine 201 correlates the received discarded network traffic related to changes in one or more traffic policies to the information contained in the received standard flow records affected by or triggering such changes. In one embodiment, the flow analysis engine 201 may correlate traffic discarded as a result of changes to the discard policy containing one or more traffic discard rules. Such rules may be loaded by a network policy enforcement device in advance to prevent certain types of traffic from entering a network, or in response to a DDoS attack detected by the attack mitigation device 102, for example.

In step 308, if the discarded network information is received, the encoding and distribution engine 203 preferably encodes the discarded traffic counters in the associated flow record to yield an enhanced flow record, while maintaining the initial network flow information contained in the received standard flow records. In other examples, the standard flow information may additionally be augmented with policy information. For example, the enhanced flow record may describe whether the flow matches a configured/changed network traffic policy signature, or not, and may identify that signature. Generally, any given flow may be augmented by any combination of the above discarded traffic information. The discarded traffic information chosen for augmentation by the encoding and distribution engine 203 can be based on user configuration, for example.

According to an embodiment of the present invention, in step 310, the encoding and distribution engine 203 may store the augmented data flow record in a centralized enhanced flow record repository 118. The repository 118 may be a conventional, fault tolerant, relational, scalable, secure database such as Oracle or Sybase. Relational databases are an extension of a flat file. Relational databases consist of a series of related tables. The tables are interconnected via a key field. Alternatively, the enhanced flow record repository 118 may be implemented using various standard data-structures, such as an array, hash, (linked) list, struct, structured text file (e.g., XML), table, and/or the like. Also, the repository 118 may be implemented as a mix of data structures, objects, and relational structures. Repositories 118 maintained by each network monitor 112 may be consolidated and/or distributed in countless variations through standard data processing techniques. Portions of repositories 118, e.g., tables, may be exported and/or imported and thus decentralized and/or integrated. Storage of the augmented flow records in a repository results in the ability to integrate traffic policies and their processing in real-time operational unity with network signaling, packet or data content (network traffic) and to make situational deductions and to take action on that substantially live-data as it is being transmitted between points within a network. The usefulness here is the ability to take meaningful derived or deduced action on the discarded traffic information (or to use such information in relationship to other situations) to predictively inform of, alert on, alter or prepare for, or shape or execute a desired outcome related to a variety of traffic policies. In an embodiment, the repository 118 can permit one or more network monitors 116 to track dropped byte/packets for specific data flows.

In step 312, the encoding and distribution engine 203 may create a managed object based on the augmented data flow record. The managed object may be a representation of manageable property of any configurable network device. In various embodiments, the managed objects may be database entries, routing tables, event triggers, or other network configuration parameters. For example, the encoding and distribution engine 203 may create a managed object based on matching dropped packet/byte counters.

This augmentation and flow records redistribution is preferably performed in real-time. The augmented flow records further preferably use a standard flow representation method to encode and send the discarded traffic information, such as the industry-standard IPFIX format and NetFlow version 9 format. Augmented flow records can thus be processed by both standard flow analysis tools as well as flow analyzers enhanced to make use of the additional discarded traffic information.

In one embodiment, the packets include the augmented flow information implemented using Netflow. According to one implementation, the encoding and distribution engine 203 adds new "field type definitions" and populates these new fields with the retrieved discarded traffic information. More specifically, Netflow (version 9) information may be sent in packets that contain header information and then one or more enhanced flow records. All version 9 flow packets (including augmented flow packets) preferably use a standard header format, which is defined by the Netflow v9, in one implementation.

In more detail, as shown in FIG. 4, the packet headers include the protocol (Netflow) version, record count, system uptime, a time stamp, sequence number and source identification.

According to an embodiment of the present invention, the content and format of these records is defined by a Netflow v9 template, which may be sent periodically by the flow sources using the Template FlowSet packet format, for example. This is a standard packet format for NetFlow v9. Each template sent by a flow source is given a unique ID, which must be placed in the FlowSet Template ID field of a packet, so that the receiver can know how to decode the received flow records.

The template defines which data fields are present in each flow record and in which order, what values represent, and what size values are. Some exemplary field types that might be defined in a standard NetFlow v9 Template are illustrated in Table (1) below:

TABLE 1

| Field Type | Field ID | Field Length | Description |
|---|---|---|---|
| IPV4 SRC ADDR | 8 | 4 | IPv4 Source Address |
| IPV4 DST ADDR | 12 | 4 | IPv4 Destination Address |
| L4 SRC PORT | 7 | 2 | TCP/UDP source port number |
| L4 DST PORT | 11 | 2 | TCP/UDP dest. port number |
| PROTOCOL | 4 | 1 | IP Protocol |
| DRP BYTE CNT | 10 | 4 | Total number of dropped bytes |
| DRP PCKT CNT | 14 | 4 | Total number of dropped packets |

Referring now to FIG. 5, based on the above template, FIG. 5 shows a sample enhanced flow record. (For readability, the size of the fields has been rounded up to 4 bytes, even though in actuality they may use different sizes).

According to one embodiment, the encoding and distribution engine 203 of the network monitor 112 adds new field type definitions to represent the new discarded network traffic information being added to the augmented flow records. The encoding and distribution engine 203 sends out an annotated flow template using the standard flow template format and incorporating these new field types. The encoding and distribution engine 203 then sends annotated flows using the standard flow format and incorporating the new discarded traffic information defined by the template definition.

In summary, various embodiments of the present invention disclose a novel approach to augment network flow records with collected discarded traffic information. The disclosed approach provides a number of advantages. One benefit of the above-described flow augmentation approach is that all standard flow template fields can now be incorporated into augmented flow records, and then additional template fields can be added to provide arbitrary information related to various network traffic policies. When the flow is re-exported with the additional discarded traffic information, the ability of existing flow analysis software to decode and read the standard flow fields is not impacted. On the other hand, a scalable and flexible way to support new analysis software is provided, which can make use of both the standard and new flow annotation fields, from the same NetFlow v9 packet. As yet another advantage, providing network policy changes information in relation to discarded traffic counters broken down by individual flows can improve understanding on how the network traffic policies are being used. This near-real-time information can be used for taking appropriate steps to initiate a change if warranted. Furthermore, network operators can use the information stored in the repository 118 as a historical reference when performing root cause analysis to pinpoint which policy changes led to discarded traffic and/or to take active countermeasures against detected malicious activity.

Most preferably, the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for correlating discarded network traffic with network policy events in a network, the method comprising:
   receiving a flow record from a first network device in a second network device, the flow record including initial network flow information in a flow record format;
   receiving, by the second network device, network traffic information discarded by an attack mitigation enforcement device;
   correlating, by the second network device, the received flow record with the received discarded network traffic information related to changes in one or more traffic policies relative to information in the received flow record wherein prescribed user configuration determines the discarded network traffic information to be correlated with the received flow record;
   encoding, by the second network device, the discarded network traffic information in the received flow record based on the correlation while maintaining the initial network flow information to yield an enhanced flow record whereby one or more field definitions are added to the received flow record to be populated with the received discarded network traffic information; and
   providing a report to a user relating to the enhanced flow information including augmented network flow information indicating specific flow records as configured by a user.

2. The method as recited in claim 1, further comprising storing the enhanced flow record in a flow record repository.

3. The method as recited in claim 1, further comprising receiving network traffic policy information from the first network device.

4. The method as recited in claim 3, wherein the network traffic policy information comprises a plurality of discard rules configured to discard network traffic matching predetermined criteria.

5. The method as recited in claim 3, further comprising monitoring one or more network flows using a plurality of the enhanced flow records stored in the flow record repository.

6. The method as recited in claim 1, wherein the discarded network traffic information includes at least a number of dropped packets.

7. The method as recited in claim 1, wherein the network comprises a software defined network (SDN) and wherein the first network device and the second network device comprise SDN enabled network devices.

8. The method as recited in claim 7, wherein the first network device and the second network device are communicatively coupled to an SDN controller and wherein receiving the discarded network traffic information comprises receiving, by the second network device, the discarded network traffic information.

9. The method as recited in claim 8, wherein the SDN network devices comprise OpenFlow switches and wherein the SDN controller comprises an OpenFlow controller.

10. A monitoring system comprising:
a monitored network comprising a plurality of devices;
one or more physical network elements;
an attack mitigation enforcement device communicatively coupled to the monitored network by the one or more physical network elements;
a flow record repository for storing flow record information; and
one or more network monitoring devices communicatively coupled to the network policy enforcement device and to the monitored network by the one or more physical network elements and communicatively coupled to the flow record repository, wherein the one or more network monitoring devices are configured and operable to:
receive a flow record including initial network flow information from the one or more physical network elements in a flow record format;
receive discarded network traffic information associated with network traffic dropping policy from the attack mitigation enforcement device;
correlate the received flow record with the received discarded network traffic information related to changes in one or more traffic policies relative to information in the received-flow record wherein prescribed user configuration determines the discarded network traffic information to be correlated with the received flow record; and
encode the discarded network traffic information in the received flow record based on the correlation while maintaining the initial network flow information to yield an enhanced flow record whereby one or more field definitions are added to the received flow record to be populated with the received discarded network traffic information; and provide a report to a user relating to the enhanced flow information including augmented network flow information indicating specific flow records as configured by a user.

11. The monitoring system as recited in claim 10, wherein the one or more network monitoring devices are further configured and operable to store the enhanced flow record in the flow record repository.

12. The monitoring system as recited in claim 10, wherein the one or more network monitoring devices are further configured and operable to receive network traffic dropping policy information from the one or more physical network elements.

13. The monitoring system as recited in claim 12, wherein the network traffic dropping policy comprises a plurality of discard rules configured to discard network traffic matching predetermined criteria.

14. The monitoring system as recited in claim 10, wherein the discarded network traffic information includes at least a number of dropped packets.

15. A software-defined network (SDN) traffic monitoring system comprising:
a monitored SDN network comprising a plurality of devices;
a SDN enabled switch communicatively coupled to the monitored network;
a SDN controller configured to interface with the SDN enabled switch;
an attack mitigation enforcement device communicatively coupled to the monitored SDN network;
a flow record repository for storing flow record information; and
one or more network monitoring devices communicatively coupled to the SDN enabled switch by the SDN controller and communicatively coupled to the flow record repository, wherein the one or more network monitoring devices are configured and operable to:
receive a flow record including initial network flow information from the SDN controller in a flow record format;
receive discarded network traffic information associated with network traffic dropping policy from the attack mitigation enforcement device;
control the data flow rate to prevent a TCP end system from sending data packets at rates greater than an access link permits to control queuing in router buffers;
correlate the received flow record with the received discarded network traffic information related to changes in one or more traffic policies relative to information in the received traffic flow wherein prescribed user configuration determines the discarded network traffic information to be correlated with the received flow record;
encode the discarded network traffic information in the received flow record based on the correlation while maintaining the initial network flow information to yield an enhanced flow record whereby one or more field definitions are added to the received flow record to be populated with the received discarded network traffic information, whereby a user selects the discarded network traffic information to be encoded in the received flow record, wherein discarded selected network traffic information is selected from the group consisting of: an Access Control List (ACL); a flow specification object; and a black hole route; and provide a report to a user relating to the enhanced flow information including augmented network flow information indicating specific flow records as configured by a user.

16. The monitoring system as recited in claim 15, wherein the network traffic dropping policy comprises at least one of: a priority policy, a rate policy and a discard policy.

17. The monitoring system as recited in claim 15, the one or more network monitoring devices are further configured and operable to monitor one or more network flows using a plurality of the enhanced flow records stored in the flow record repository.

18. The monitoring system as recited in claim 15, wherein the SDN enabled switch comprises an OpenFlow switch and wherein the SDN controller comprises an OpenFlow controller.

* * * * *